United States Patent [19]

Prinz et al.

[11] 4,309,104
[45] Jan. 5, 1982

[54] AIRCRAFT VELOCITY-ALTITUDE MEASURING MEANS

[75] Inventors: Reinhard Prinz, Aalen; Karl Felle, Oberkochen, both of Fed. Rep. of Germany

[73] Assignee: Carl Zeiss-Stiftung, Oberkochen, Fed. Rep. of Germany

[21] Appl. No.: 191,368

[22] Filed: Sep. 29, 1980

Related U.S. Application Data

[63] Continuation of Ser. No. 17,029, Mar. 2, 1979, abandoned, which is a continuation of Ser. No. 811,825, Jun. 30, 1977, abandoned.

[30] Foreign Application Priority Data

Aug. 14, 1976 [DE] Fed. Rep. of Germany ....... 2636769

[51] Int. Cl.$^3$ .......................... G01P 3/36; G01C 3/08
[52] U.S. Cl. ............................................ 356/28; 356/4
[58] Field of Search ...................... 356/4, 28

[56] References Cited

U.S. PATENT DOCUMENTS

| | | | |
|---|---|---|---|
| 2,866,373 | 12/1958 | Doyle et al. | 356/28 |
| 3,018,555 | 1/1962 | Willey et al. | 356/28 |
| 3,057,071 | 10/1962 | Sinn | 356/28 |
| 3,059,521 | 10/1962 | Clemens et al. | 356/28 |
| 3,799,671 | 3/1974 | Schweizer | 356/28 |
| 3,994,583 | 11/1976 | Hutchins | 356/28 |

FOREIGN PATENT DOCUMENTS 1249302 10/1971 United Kingdom .................. 356/28

*Primary Examiner*—S. C. Buczinski
*Attorney, Agent, or Firm*—Hopgood, Calimafde, Kalil, Blaustein & Judlowe

[57] ABSTRACT

The invention contemplates use of a cylindrical lens oriented transverse to an aircraft axis, in conjunction with two light-sensitive detectors in the image plane of the lens, to develop two time-displaced electrical output signals which represent aircraft-motion scanning of terrain by the respective detectors; basically simple circuitry develops the velocity-altitude ratio by measuring the instantaneous displacement time between the two signals. The same cylindrical lens and detecting circuitry may be provided in multiple and in particular relative orientations, to additionally develop drift-angle of the aircraft axis with respect to its instantaneous ground-velocity vector.

10 Claims, 12 Drawing Figures

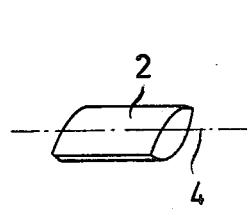
Fig.3
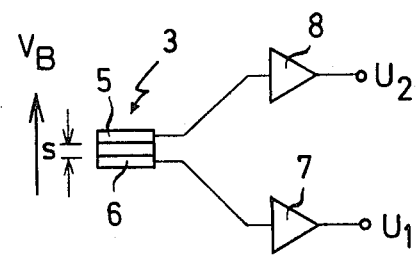
Fig.4
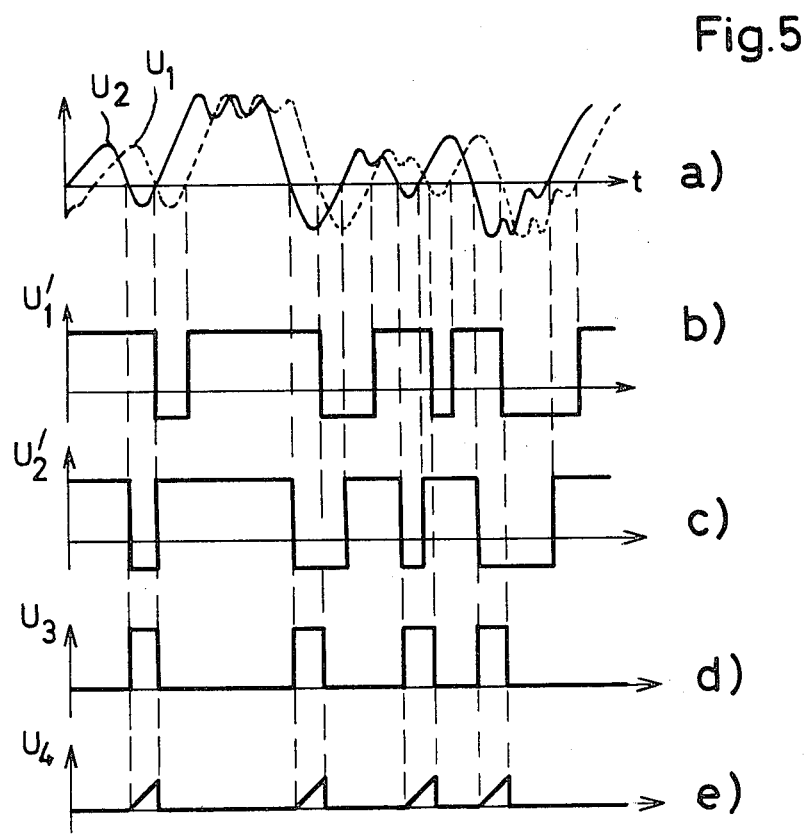

AIRCRAFT VELOCITY-ALTITUDE MEASURING MEANS

This application is a continuation of copending application Ser. No. 017,029, filed Mar. 2, 1979, which in turn was a continuation of application Ser. No. 811,825, filed June 30, 1977, both now abandoned.

The present invention relates to a device for measuring the speed and/or the direction of movement of picture structure in the image plane of an optical system.

Such a problem arises for instance in connection with the control of an aerial camera. In this case, the angular velocity of the terrain passing beneath the airplane and the angle of drift of the airplane are to be measured, and control values are to be derived therefrom for orienting the camera and for the time sequence of desired aerial photographs.

This measurement is customarily effected by means of a so-called overlap control (Uberdeckungsregler). In this technique, the terrain which is flown over is focused on a ground-glass plate over which an endless bar chain is moved in the same direction as the focused section of the terrain. The observer must adjust the speed of the bar chain in such a manner that the bars move with the same speed as the image of the terrain appearing on the ground-glass plate. At the same time, he must turn the overlap control in such a manner that the bar chain is parallel to the direction of movement of the image of the terrain.

From the speed of the bar chain and the angle of rotation of the overlap control, the values v/h and H are available, v being the ground speed of the aircraft, h the altitude of the aircraft, and H the angle between the direction of flight and the longitudinal axis of the aircraft. The values v/h and H then control the actual picture camera.

It is clear that such an overlap control cannot operate automatically but requires continuous supervision by an observer.

In order to relieve the work of the observer, it is however, desirable to measure the values v/h and H automatically.

One known solution provides a spatial frequency filter between the objective of the control and a photosensor. From the modulation frequency of the photoelectric current the value v/h can be derived if the filter is known, but not the value H. This leads to errors in measurement in the case of large values of H.

In another solution, a given line pattern is scanned on the photo cathode of a photo multiplier and the corresponding video information is stored. If this pattern migrates, the new video signal and the stored video signal are fed to a correlator whose output signal controls the line pattern to be scanned via deflection coils. From the guidance signal the values v/h and H are determined.

An instrument which permits measurement by the method described requires a very high expenditure for design and electronics and does not find general use, if only because of its high price.

The object of the present invention is now to provide an apparatus for measuring the speed and/or direction of movement of a picture structure which is of simple design, operates automatically, and is able to supply the values v/h and H with sufficient accuracy, even in the case of very rapidly moving picture structure in the image plane.

This purpose is achieved with respect to the measurement of the v/h rate by so arranging a cylindrical lens system that its effective cylinder axis is perpendicular to the direction of movement of the picture structure, and by providing in the image plane of the cylindrical lens system, means producing a signal which is proportional to the speed of displacement of line structures in said plane.

A cylindrical lens focuses light emerging from a luminous point along a line which lies parallel to the axis of the cylinder. Therefore, if a picture is imaged by means of a cylindrical lens, a line structure is obtained in the image plane. The brightness of each line represents the integral of all individual brightnesses along said line. If the cylindrical lens now moves relative to the imaged picture structure, different bright lines move in the image plane perpendicular to the axis of the cylinder. If two photoelectric receiving elements are positioned in spaced relation, on an alignment that is perpendicular to the axis of the cylinder in the image plane, a signal may be developed which is proportional to the speed of displacement of the line structure. A difference diode can, for instance, be used as a receiver. It consists of two light-sensitive regions which are separated from each other, and it is so arranged that the direction of movement of the line structure is perpendicular to the line of separation between the two light-sensitive regions.

The new device described is directly suitable, without further structure, to control an aerial camera when the drift angle H is negligibly small, as in the case of rapidly flying airplanes, at relatively low altitude. In this case, the device is so oriented that the cylinder axis of the cylindrical lens system is exactly perpendicular to the longitudinal axis of the aircraft. The signal supplied by the device is then proportional to the value v/h which is required in order to control the time sequence of the photographs.

In aerial photographs from relatively slowly flying aircraft, it is necessary to determine, in addition to the value of v/h, also the drift angle H.

The new device for measuring the speed and the direction of movement of imaged picture structure is characterized by the fact that at least two cylindrical lens systems are so arranged that their effective cylinder axes form an angle which encloses the direction of movement, that in the image plane of each cylindrical lens system means is provided to produce a signal which is proportional to the component of line-structure image displacement perpendicular to the axis of the associated cylindrical lens system, and that these signals are fed to an evaluation circuit.

It is particularly advantageous to so arrange a third cylindrical lens system that its effective cylinder axis forms equal angles with the cylinder axes of the other two systems, and that this cylindrical system is also provided with means to produce a signal which is proportional to the speed of displacement of line structures perpendicular to the cylinder axis.

If such a device consisting of three cylindrical lenses is so arranged that the perpendicular to the cylinder axis of the central lens system agrees with the direction of movement, for instance with the longitudinal axis of an airplane, then speed of movement, for example the value v/h, may be determined from the signals of this central system while the direction of movement, and therefore for instance the drift angle H, may be determined from the signals of the two outer cylinder systems.

It is also possible with a device which consists of two cylindrical lenses which enclose the direction of movement to determine both the speed and the direction of movement of the picture structure. In this case, the signals associated with the two cylindrical lens systems are to be correspondingly converted electronically.

A device having two cylinder systems can also be arranged on a motor-driven rotatable plate. In this case, the output of the evaluation circuit is connected with the rotary motor which turns the plate until the signal from the two cylindrical lens systems is exactly the same value. The direction of movement then agrees with the angle bisector between the two cylinder systems, and the speed of movement can be derived in simple fashion from their output signals.

The invention is described below with reference to the accompanying drawings, in which:

FIG. 3 is a perspective view of the cylindrical lens of FIGS. 1 and 2;

FIG. 4 shows a difference diode and associated circuit elements, serving to measure speed of displacement of line structure in the image plane of the device of FIGS. 1 and 2;

FIGS. 5a to 5e are voltage-pulse diagrams to explain the manner of operation of circuit elements of FIG. 1, utilizing the difference diode of FIG. 4;

Figure 1:
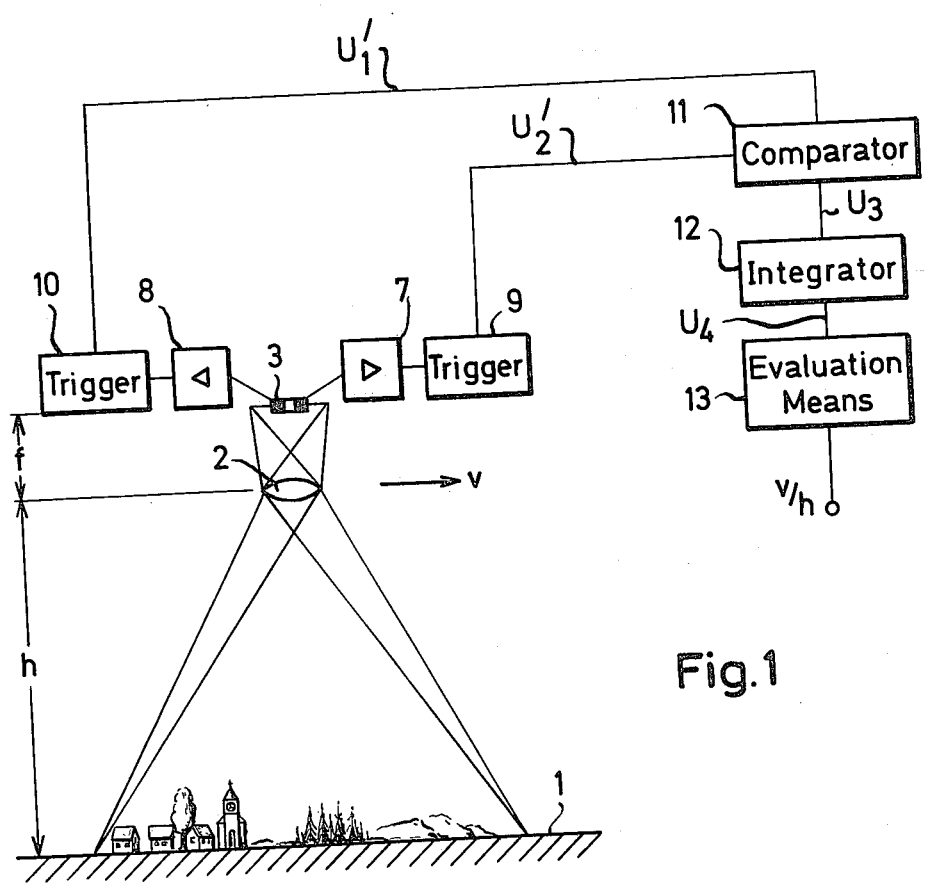
FIG. 1 is a diagrammatic view in elevation of an airborne embodiment of the invention, provided with a cylindrical-lens system and adapted to measure the speed of movement of picture structure in the image plane of the lens system, the view being transverse to the direction of airborne motion.

FIG. 1 shows diagrammatically a device adapted to control an aerial camera on a rapidly flying aircraft. This aircraft is moving at an altitude h with a speed v over the terrain 1. In the aircraft, there is mounted the new device, which consists of a cylindrical lens 2 and a receiver 3 arranged in its image plane, as well as an electrical circuit to be described.

Figure 2:
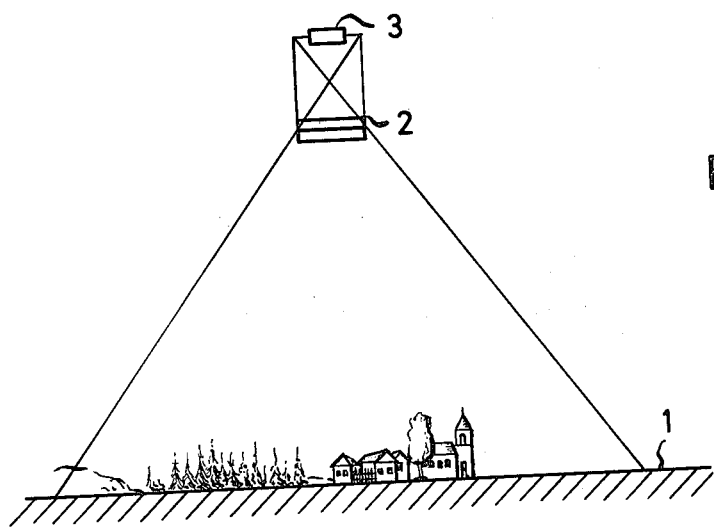
FIG. 2 is another view in elevation of the device of FIG. 1, taken in the plane perpendicular to that of FIG. 1.

The cylindrical lens 2, shown by itself in FIG. 3, acts, in the longitudinal motion plane shown in FIG. 1, as a collecting lens; in the transverse aspect shown in FIG. 2, lens 2 acts as a flat plate without focusing properties. In this way, the cylindrical lens 2, which is preferably developed as a multiple-element cylindrical-lens system for reasons of better light yield, produces in its image plane, line structures which lie parallel to the cylindrical axis 4. Such line structures correspond to lines or swaths across the instantaneous structure 1 of the subject matter or picture field, and the brightness value of each line represents the instantaneously applicable integral of all individual brightnesses of the picture structure along the particular line. As will be readily apparent, the picture in the image plane of cylindrical lens 2 thus consists of lines of varying brightness.

If the aircraft is moving with the speed v, then the line structure moves in the image plane of lens 2 with the speed $V_B = (v/h) \cdot f$, in which f is the focal length of the cylindrical lens 2. The picture therefore moves with the speed $V_B$ over the sensitive region of the receiver 3, which, as shown in FIG. 4, may comprise a difference diode which contains two light sensitive regions 5 and 6, separated from each other by the distance s.

Alternating-current amplifiers 7 and 8 are connected to the respective light-sensitive regions 5 and 6. The time-variation of signals produced by said amplifiers is shown in FIG. 5a. As can be noted, the voltages $U_1$ and $U_2$ correspond to each other, but are shifted with respect to each other by the time $t = s/V_B$.

Two triggers 9 and 10 transform the signals $U_1$ and $U_2$ into rectangular pulses, as shown in FIGS. 5b and 5c. Thereafter, a comparator 11 differentially responds to the two rectangular-pulse signals, signal $U_3$ of FIG. 5d being a succession of polarized difference pulses, for example, one positive difference pulse for each plus-polarized detected difference between the two rectangular-pulse signals; these polarized difference pulses have a duration which corresponds to the time shift t between the signals $U_1$ and $U_2$. These pulses are integrated in the integrator 12 so that in each case at the end of each pulse there is produced a voltage $U_4$ whose amplitude corresponds to the time value t (FIG. 5e).

The signal of FIG. 5e is then fed to an evaluation circuit 13 which stores a plurality of individual signals and forms their average value. This average value is then converted into an output signal which is directly proportional to the desired value v/h and which can accordingly serve to control a suitably connected aerial camera.

Figure 6:
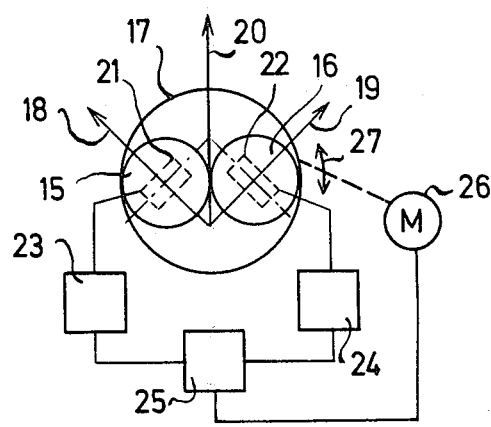
FIG. 6 is a schematic diagram to illustrate a modified embodiment, having two cylindrical-lens systems.

If the aircraft moves in such a manner that the drift angle H must also be taken into account, then a device is employed as shown in FIG. 6. This device contains two cylindrical lens systems 15 and 16 which are arranged on a rotatable plate 17. The perpendiculars 18 and 19 to the cylinder axes of the two cylindrical lenses 15 and 16 are at angular spread which embraces, i.e., extends both sides of, the direction of movement 20.

Upon the movement of the picture structure to be evaluated, there are produced in the image planes of the lenses 15 and 16 line systems which, in the example shown, are perpendicular to each other and move along the directions 18 and 19. The movement of the picture structure is therefore broken down into the components 18 and 19 by means of this device.

In the image planes of the cylindrical lenses 15 and 16, there are provided light-sensitive receivers 21 and 22 which may, as in FIG. 1, be difference diodes (FIG. 4), each receiver 21 (22) having its own signal-processing circuitry 23 (24) functioning as described in connection with FIG. 5. The circuits 23 and 24 therefore each deliver a signal which is proportional to the speed of movement of image line structures over the receivers 21 and 22 and thus to the speed vectors in the direction of the two components 18 and 19.

From the output voltages of the circuits 23 and 24, the speed of motion and the drift angle H can now be directly calculated electronically. However, if an extremely rapid control of the associated aerial camera is not of vital importance, the component signals formed at 23 and 24 are fed to an evaluation circuit 25 which transforms same in such manner as to directionally control a rotary drive motor 26. The latter drives plate 17 in the appropriate direction (suggested by the double-ended arrow 27) until the signals at the outputs of 23 and 24 are of the same value. The v/h value is calculated from the signals 23 and 24; the angle of rotation of plate 17, with respect to the aircraft axis, is direct-reading for the drift angle H.

Figure 7:
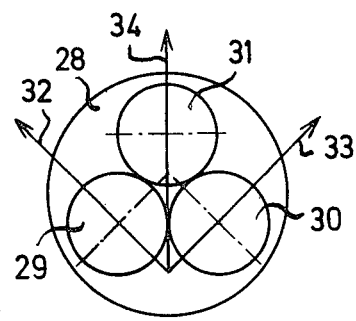
FIG. 7 is another schematic diagram to illustrate a further embodiment, having three cylindrical-lens systems.
Figure 8:
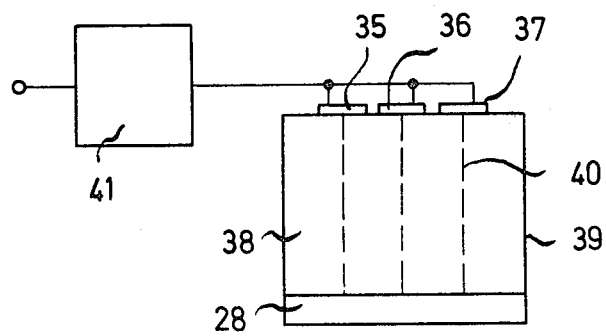
FIG. 8 is a side view of the device of FIG. 7.

In the embodiment of the invention shown in FIGS. 7 and 8, three cylindrical lens systems 29, 30 and 31 are arranged on a fixed plate 28. The two systems 29 and 30 serve once again, in the same way as the systems 15 and 16 in FIG. 6, to develop divergent components of the movement of the imaged picture structure, the directions of the components being designated 32 and 33. The third cylindrical lens 31 is so arranged that the perpendicular 34 to its cylinder axis forms equal angles with the two component directions 32 and 33.

Light rays passing through the cylindrical lenses 29, 30, 31 are separated from one another by means of tubes 38, 39, 40 and fall onto the light-sensitive receivers 35, 36, 37 disposed in the image plane. It will be understood that these receivers may again be difference diodes, each with its own signal-processing circuitry, functioning as described in connection with FIG. 5. The signals supplied by the receivers are further processed at evaluation means 41, to produce the required v/h output signal.

In use of the device shown in FIGS. 7 and 8 for controlling an associated aerial camera, the device is so mounted on the aircraft that the direction of movement 34 coincides with the longitudinal axis of the aircraft. In the case of fast flying aircraft, in which the drift angle H does not assume any great value (H<4°), the value v/h can be obtained directly from the signal produced by the cylindrical lens system 31, while the drift angle H may be derived from a comparison of the signals of the systems 29 and 30. Alternatively, if plate 28 is rotatable, as described in connection with FIG. 6, then motor-drive signals are derived from signal outputs of the receivers for lenses 29-30, and the output of the receiver for lens 31 is truly indicative of v/h.

By means of the new device, it is for the first time possible to split up the speed of movement of a picture structure into predetermined components by simple means. The new device thus finds particularly advantageous use as automatic overlap control for controlling aerial cameras. It operates completely automatically and so rapidly that it can be used also in fast low-flying airplanes.

What is claimed is:

1. An aircraft velocity/altitude measuring device, comprising two terrain-viewing cylindrical lenses disposed for direct viewing of terrain and fixedly related to each other in an orientation such that their cylinder axes are generally transverse to but at an angle extending on opposite sides of the aircraft axis, said angle being large enough to embrace the direction of the flight-velocity vector for the widest possible extent of drift-angle heading of the aircraft, whereby passing terrain features are converted by said lenses into line structures having said fixed angle relation and moving in the image planes of the respective cylindrical lenses, means including two spaced light-sensitive detector regions in the image plane of each cylindrical lens for producing separate time-varying electrical signals the time-shift between which is respectively proportional to the speed of movement of the line structures in the respective image planes of said cylindrical lenses, said spacing being in the direction perpendicular to the cylindrical axis of the associated cylindrical lens, and means for comparatively evaluating said separate electrical signals, said last-mentioned means including for the two detector regions associated with each cylindrical lens a separate comparator producing from said separate signals a voltage of amplitude corresponding to the associated time-shift.

2. Apparatus according to claim 1, in which for each of said cylindrical lenses each of said detector regions produces an independent electrical output signal, and in which each said comparator includes trigger means separately connected for operation by the respective output signals of the associated detector regions and producing rectangular-wave signals corresponding to said output signals, means including a polarized-difference comparator responsive to the respective rectangular-wave signals, whereby a succession of pulses is produced with time-shift proportioned duration, and time-measuring means connected to the output of said comparator for generating a voltage of amplitude corresponding to the measured duration of the pulses of said succession.

3. An aircraft velocity/altitude measuring device according to claim 1, in which a third terrain-viewing cylindrical lens is fixedly related to said other two cylindrical lenses in an orientation transverse to the aircraft axis and such that the third-lens cylinder axis forms equal angles with the cylinder axes of the other two cylindrical lenses, and means including two light-sensitive detector regions in the image plane of said third lens system for producing separate electrical signals the time-shift between which is proportional to the speed of movement of line structures in the image plane of the third cylindrical lens, said last-mentioned detector regions being spaced from each other in the direction perpendicular to the cylinder axis of the third cylindrical lens, and means including a comparator for producing from the separate outputs of said last-mentioned detector regions a voltage of amplitude corresponding to the associated time-shift and therefore to the instantaneous velocity-altitude function of the aircraft.

4. The device of claim 3, in which all three cylindrical lenses and their associated detector regions are mounted to a rotatable plate, drift-angle correcting and indicating means including reversible motor means for positioning said plate, and an output connection from each of said comparators to said motor means for driving said motor means in the direction to cause the outputs of said comparators to be of equal value.

5. The device of claim 1, in which both cylindrical lenses and their associated detector regions are mounted on a rotatable plate, reversible motor means for positioning said plate, and an output connection from each of said comparators to said motor means for driving said motor means in the direction to cause the outputs of said comparators to be of equal value.

6. The device of claim 1, in which the respective detector regions associated with each cylindrical lens are generally elongate in a direction parallel to the associated cylindrical-lens axis.

7. An aircraft velocity-altitude measuring device, comprising optical means consisting of two terrain-viewing cylindrical lenses disposed for direct viewing of terrain and fixedly related to each other in an orientation such that their cylindrical axes are at an angle extending on opposite sides of the aircraft axis, said angle being large enough to embrace the direction of the flight-velocity vector for the widest possible extent of drift-angle heading of the aircraft, whereby passing terrain features are converted by said lenses into line structures having said fixed-angle relation and moving in the image planes of the respective cylindrical lenses, means including a pair of spaced light-sensitive detector regions in the image plane of each cylindrical lens for producing two separate time-varying electrical signals, each said spacing being in the direction perpendicular to the cylinder axis of the associated cylindrical lens, whereby a time-shift exists as between the two separate time-varying signals associated with each cylindrical lens and such time-shift is proportional to the speed of movement of the line structures in the respective image planes of said cylindrical lenses, first means for comparatively evaluating the separate electrical signals of a first pair of detector regions to produce an output voltage of amplitude corresponding to the time-shift associated with one of said cylindrical lenses, second means for comparatively evaluating the separate electrical signals of the other pair of detector regions to produce an output voltage of amplitude corresponding to the time-shift associated with the other of said cylindrical lenses, and means comparatively responsive to both said output voltages for producing a voltage proportional to the instantaneous velocity/altitude function of the aircraft.

8. The device of claim 7, in which both cylindrical lenses and their associated detector regions are mounted on a rotatable plate, a reversible motor for positioning said plate, said last-defined means including (a) output connections from both said first and second comparative-evaluation means for driving said motor in the direction to cause said output voltages to become of equal value and (b) means electronically calculating velocity/altitude from said output voltages.

9. The device of claim 7, in which both cylindrical lenses and their associated detector regions are mounted on a rotatable plate, a reversible motor for positioning said plate, said last-defined means including a third cylindrical lens and associated spaced detector regions carried by said plate, the spacing of said last-mentioned detector regions being (a) in a direction normal to the cylindrical axis of said third cylindrical lens and oriented to the direction which bisects the direction of spacing of detector regions associated with the first two of said cylindrical lenses, the detector regions associated with the third cylindrical lens being exclusively devoted to time-shift measurement for velocity/altitude determination.

10. The device of claim 7, in which said last-defined means includes means electronically calculating both drift angle and velocity/altitude from said output voltages.

* * * * *